United States Patent
Sasaki et al.

(10) Patent No.: US 9,610,850 B2
(45) Date of Patent: Apr. 4, 2017

(54) VEHICLE CHARGING UNIT

(71) Applicants: TOYOTA JIDOSHA KABUSHIKI KAISHA, Toyota-shi, Aichi-ken (JP); SUMITOMO WIRING SYSTEMS, LTD., Yokkaichi, Mie (JP)

(72) Inventors: Masaru Sasaki, Toyota (JP); Hiroyuki Yamazaki, Yokkaichi (JP); Eiji Kitano, Toyota (JP)

(73) Assignees: TOYOTA JIDOSHA KABUSHIKI KAISHA, Toyota (JP); SUMITOMO WIRING SYSTEMS, LTD., Mie (JP)

( * ) Notice: Subject to any disclaimer, the term of this patent is extended or adjusted under 35 U.S.C. 154(b) by 156 days.

(21) Appl. No.: 14/604,162

(22) Filed: Jan. 23, 2015

(65) Prior Publication Data

US 2015/0239359 A1    Aug. 27, 2015

(30) Foreign Application Priority Data

Feb. 21, 2014   (JP) ................. 2014-031980

(51) Int. Cl.
*H02J 7/00* (2006.01)
*B60L 11/18* (2006.01)

(52) U.S. Cl.
CPC ....... *B60L 11/1818* (2013.01); *B60L 2210/30* (2013.01); *Y02T 10/7005* (2013.01); *Y02T 10/7072* (2013.01); *Y02T 10/7241* (2013.01); *Y02T 90/127* (2013.01); *Y02T 90/14* (2013.01)

(58) Field of Classification Search
USPC .................................. 320/107–115
See application file for complete search history.

(56) References Cited

U.S. PATENT DOCUMENTS

| | | | |
|---|---|---|---|
| 2012/0094162 A1* | 4/2012 | Gyenes | B60L 11/1822 429/97 |
| 2012/0322302 A1 | 12/2012 | Mori | |
| 2013/0249486 A1 | 9/2013 | Eberle | |
| 2013/0257074 A1 | 10/2013 | Eberle et al. | |
| 2013/0257374 A1* | 10/2013 | Ichikawa | B60L 11/1809 320/109 |
| 2013/0335021 A1 | 12/2013 | Meier | |

(Continued)

FOREIGN PATENT DOCUMENTS

JP    H05-28731 A    2/1993
JP    2009-146711 A    7/2009

(Continued)

*Primary Examiner* — Binh Tat
(74) *Attorney, Agent, or Firm* — Oliff PLC

(57) ABSTRACT

A vehicle charging unit includes a lid box inserted into a first hole in the body of a vehicle from outside of the vehicle and attached to the body, and an inlet fixed to the lid box. The lid box includes an attachment portion, a bottom having a second hole formed therein, and a sidewall. The bottom has a stud bolt protruding toward inside of the vehicle in a state in which the lid box is attached to the body. The inlet includes a barrel portion capable of receiving a charge connector from outside of the vehicle and a collar portion positioned around the barrel portion. The barrel portion is inserted into the second hole from inside of the vehicle and the collar portion is fixed with the stud bolt, whereby the inlet is fixed to the lid box.

3 Claims, 3 Drawing Sheets

(56) References Cited

U.S. PATENT DOCUMENTS

| | | | |
|---|---|---|---|
| 2014/0012444 A1* | 1/2014 | Wake | B60L 11/1881 701/22 |
| 2014/0042966 A1* | 2/2014 | Masuda | B60L 11/1818 320/109 |
| 2014/0060920 A1 | 3/2014 | Tamaoki et al. | |

FOREIGN PATENT DOCUMENTS

| | | | |
|---|---|---|---|
| JP | 2009-295433 A | 12/2009 |
| JP | 2011-131772 A | 7/2011 |
| JP | 2012-133925 A | 7/2012 |
| JP | 2012-236457 A | 12/2012 |
| JP | 2013-197095 A | 9/2013 |
| JP | 2013-203393 A | 10/2013 |
| JP | 2014-003016 A | 1/2014 |
| WO | 2012/157489 A1 | 11/2012 |

* cited by examiner

VEHICLE CHARGING UNIT

This nonprovisional application is based on Japanese Patent Application No. 2014-031980 filed on Feb. 21, 2014 with the Japan Patent Office, the entire contents of which are hereby incorporated by reference.

BACKGROUND OF THE INVENTION

Field of the Invention

The present invention relates to a vehicle charging unit removably connected to a charging cable connected to an external power supply.

Description of the Background Art

In recent years, plug-in vehicles such as EVs (Electric Vehicles) and PHVs (Plug-in Hybrid Vehicles) have been developed, which include a system for charging a power storage device with power supplied from an external power supply such as a plug-in station. Such a plug-in vehicle has a charging unit on a side face of the vehicle to allow external charging through a charging cable.

For example, Japanese Patent Laying-Open No. 2011-131772 discloses a charging unit including an inlet connectable with a charging cable, a guide for guiding the charge connector of the charging cable to a connection position in the inlet, and a light source for emitting light to the guide. The charging unit is provided in a power feed compartment provided in the body of a vehicle.

SUMMARY OF THE INVENTION

In the charging unit disclosed in Japanese Patent Laying-Open No. 2011-131772, the inlet is fixed from the outside of the vehicle to a lid box inserted and attached in a hole formed in the body of the vehicle from the outside of the vehicle. The lid box is a section that defines at least part of the power feed compartment and includes a bottom to which the inlet is fixed, an attachment portion attached to the vehicle body, and a sidewall upright from the bottom and connecting the bottom with the attachment. The lid box is fixed at the attachment portion with a bolt or other means from the outside of the vehicle.

The inlet is fixed with a bolt or other means to the bottom of the lid box from the outside of the vehicle so as to fit in the inside of the lid box. During fixing, a bolt and a tool for fastening the bolt have to be inserted into the lid box, and a space for ensuring workability is required. For this reason, the lid box is configured such that the part receiving the bolt is at a distance from the sidewall located around that part, so that the lid box has a large form. However, with the lid box having a large form, the hole formed in the body of the vehicle to receive the lid box is also large in size, thereby reducing the rigidity of the body of the vehicle.

The present invention is made in view of the problem above and aims to provide a vehicle charging unit with which reduction in rigidity of the vehicle body can be suppressed.

A vehicle charging unit based on the present invention includes a lid box inserted into a first hole in a body of a vehicle from outside of the vehicle and attached to the body, and an inlet fixed to the lid box. The lid box includes an attachment portion attached to the body, a bottom having a second hole formed therein, and a sidewall upright from the bottom and connecting the bottom with the attachment portion. The bottom has a stud bolt protruding toward inside of the vehicle in a state in which the lid box is attached to the body. The inlet includes a barrel portion capable of receiving a charge connector from outside of the vehicle and a collar portion positioned around the barrel portion. The barrel portion is inserted into the second hole from inside of the vehicle and the collar portion is fixed with the stud bolt, whereby the inlet is fixed to the lid box.

In this configuration, since the inlet is fixed on the inside of the vehicle, a work space sufficient for fixing operation can be kept irrespective of the size of the lid box. The size of the lid box therefore can be reduced, and the first hole in the body of the vehicle for receiving the lid box can be reduced in size. Accordingly, reduction in rigidity of the body of the vehicle can be suppressed.

In the vehicle charging unit based on the present invention, preferably, the first stud bolt is provided so as not to be exposed on outside of the vehicle in a state in which the lid box is attached to the body.

This configuration eliminates the need for a cover for hiding the first stud bolt from the outside of the vehicle and reduces the number of components. It becomes unlikely that the first stud bolt is removed from the outside of the vehicle, thereby preventing theft of the inlet.

In the vehicle charging unit based on the present invention, preferably, the attachment portion is a flange portion provided at an end portion of the sidewall positioned on an opposite side to the bottom and has a second stud bolt protruding toward the bottom side. In this case, preferably, the attachment portion is attached to the body with the second stud bolt.

In this configuration, the lid box can be attached to the body by inserting the second stud bolt into the through hole provided in advance on the body side. Separate cut-through work for cutting through the body becomes unnecessary during attachment of the lid box. Workability is thus improved.

In the vehicle charging unit based on the present invention, preferably, the second stud bolt is provided so as not to be exposed on outside of the vehicle in a state in which the lid box is attached to the body.

This configuration eliminates the need for a cover for hiding the second stud bolt from the outside of the vehicle and reduces the number of components. It becomes unlikely that the second stud bolt is removed from the outside of the vehicle, thereby preventing theft of the lid box and the inlet.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

An embodiment of the present invention will be described in details below with reference to the drawings. In the embodiment illustrated below, the same or common parts are denoted with the same reference signs in the figures and a description thereof is not repeated.

Figure 1:
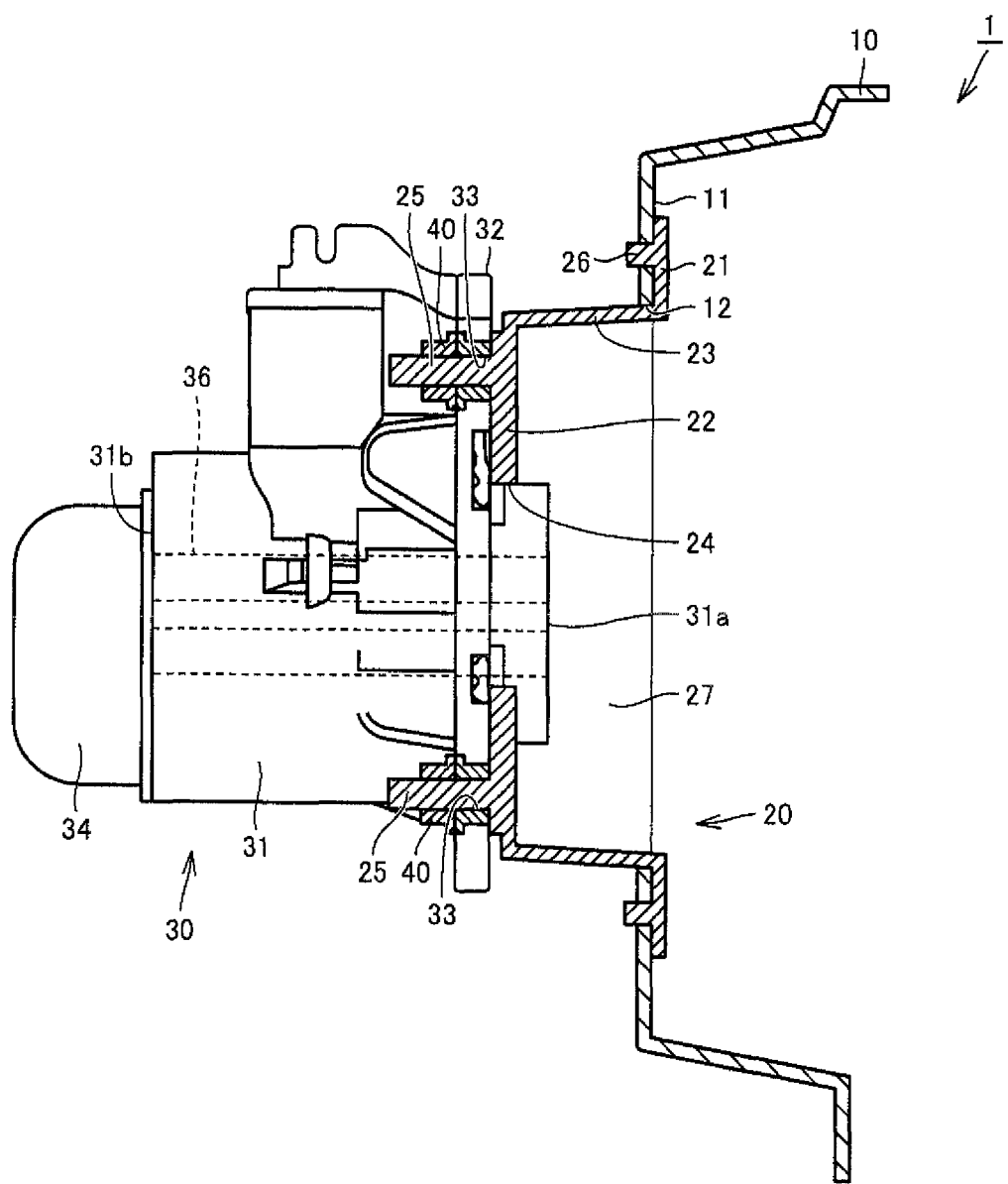
FIG. 1 is a cross-sectional view schematically showing a vehicle charging unit according to an embodiment of the present invention.
Figure 2:
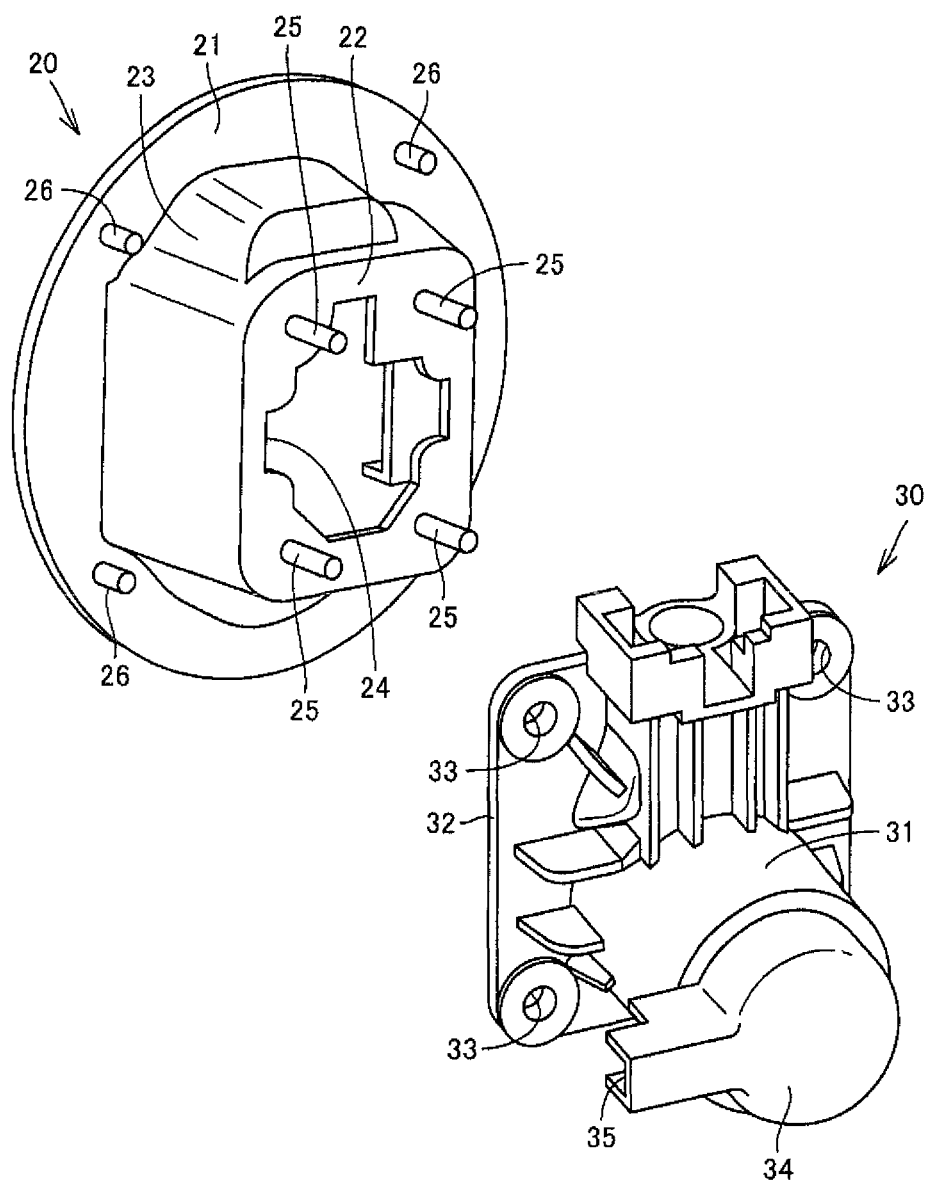
FIG. 2 is an exploded perspective view of a lid box and an inlet that are included in the vehicle charging unit shown in FIG. 1.

FIG. 1 is a cross-sectional view schematically showing a vehicle charging unit according to the present embodiment. FIG. 2 is an exploded perspective view of a lid box and an inlet that are included in the vehicle charging unit shown in FIG. 1. Referring to FIG. 1 and FIG. 2, a vehicle charging unit 1 according to the present embodiment will be described. The vehicle charging unit 1 is removably connected to a charging cable connected to an external power supply (not shown) for charging a power storage device (not shown) of a plug-in vehicle such as an EV or a PHV. AC (Alternating Current) power supplied through the vehicle charging unit 1 is converted into DC (Direct Current) power by a converter (not shown) to charge the power storage device.

As shown in FIG. 1 and FIG. 2, the vehicle charging unit 1 includes a lid box 20 and an inlet 30. The lid box 20 is attached to a depression 11 that is part of a vehicle body 10 formed so as to be recessed toward the inside of the vehicle. The lid box 20 includes an attachment portion 21 attached to the vehicle body 10, a bottom 22, and a sidewall 23 upright from the bottom 22 and connecting the bottom 22 with the attachment portion 21.

The attachment portion 21 is arranged so as to abut from the outside of the body on the vicinity of an opening 12 as a first hole provided in the depression 11. The attachment portion 21 is a flange portion provided at an end portion of the sidewall 23 located on the opposite side to the bottom 22 and has a stud bolt 26 protruding toward the bottom 22 side. The attachment portion 21 is attached to the vehicle body 10 using a nut or other means with the stud bolt 26 inserted in a through hole (not shown) provided in the vicinity of the opening 12 of the vehicle. That is, the attachment portion 21 is attached to the vehicle body 10 such that the stud bolt 26 is not exposed on the outside of the vehicle.

The bottom 22 is arranged in the inside (vehicle inside) of the vehicle body 10. The bottom 22 has an opening 24 as a second hole at the center and a stud bolt 25 protruding toward the inside of the vehicle in a state in which the lid box 20 is attached to the body 10. The stud bolt 25 is provided on the periphery of the opening 24.

The sidewall 23 is formed like a frame so as to surround a front end 31a of a barrel portion 31 of the inlet 30 described later in a state in which the inlet 30 is fixed to the lid box 20. The sidewall 23 and the bottom 22 form an open space 27. The open space 27 is open toward the outside of the vehicle to allow a charge connector of a charging cable to be inserted into the inlet 30 from the outside of the vehicle.

The inlet 30 includes a barrel portion 31 capable of receiving a charge connector from the outside of the vehicle, a collar 32 positioned around the barrel portion 31, and a cover portion 34 provided so as to cover the back end 31b of the barrel portion 31.

The barrel portion 31 has an approximately cylindrical shape and has a plurality of connection pin accommodating portions 36 for accommodating connection pins (not shown) connected to the charge connector of a charging cable. The barrel portion 31 is inserted into the opening 24 of the bottom 22 from the inside of the vehicle, whereby the front end 31a of the barrel portion 31 is arranged at a position closer to the bottom 22 in the opening space 27.

The collar portion 32 has an insertion hole 33 provided at a position corresponding to the stud bolt 25, The collar portion 32 is held between the lid box 20 and the nut 40 by fitting the nut 40 from the front end side of the stud bolt 25 and fastening the nut 40 with the insertion hole 33 fitted on the stud bolt 25, The inlet 30 is thus fixed to the lid box 20. In this state, the inlet 30 is fixed to the lid box 20 such that the stud bolt 25 is not exposed on the outside of the vehicle.

The cover portion 34 has an outlet port 35 from which a harness 50 (see FIG. 3 and FIG. 4) is pulled out. The harness 50 is connected to the back end of the connection pins accommodated in the connection pin accommodating portions 36. The other end of the harness that is positioned on the opposite side of the connection pins is connected to a converter (not shown).

Figure 3:
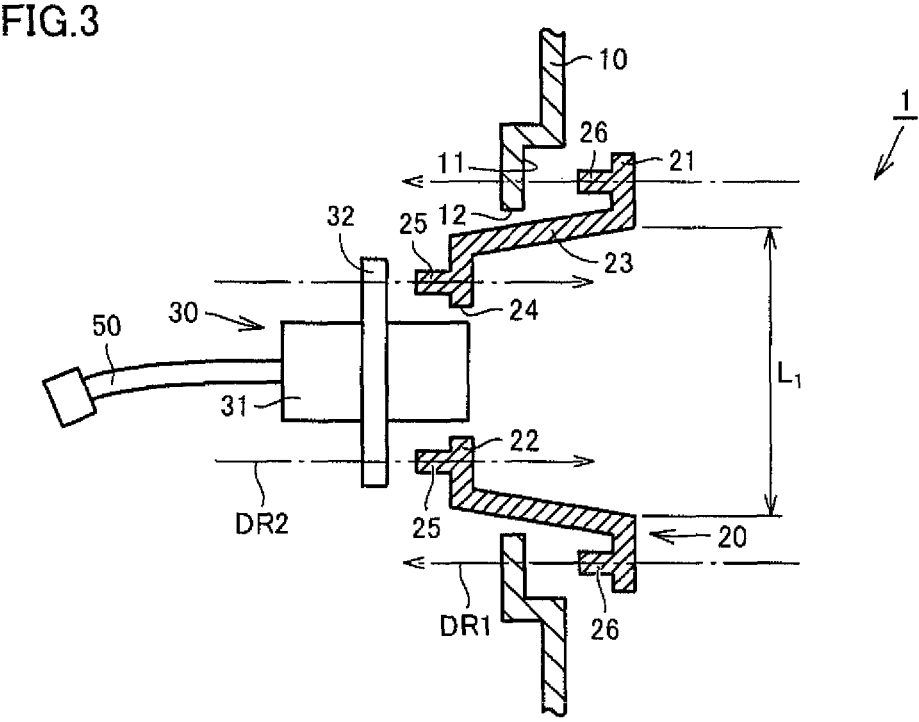
FIG. 3 is a diagram illustrating the manner of installation of the vehicle charging unit shown in FIG. 1.

FIG. 3 is a diagram illustrating the manner of installation of the vehicle charging unit shown in FIG. 1. Referring to FIG. 3, the manner of installation of the vehicle charging unit 1 according to the present embodiment will be described.

As shown in FIG. 3, to install the vehicle charging unit 1, first, the lid box 20 is inserted into the opening 12 of the body 10 from the outside of the vehicle. In doing so, the stud bolt 26 provided on the attachment portion 21 is inserted into the through hole of the body 10 along the direction DR1, whereby the lid box 20 is attached to the vehicle body 10.

The barrel portion 31 of the inlet 30 is then inserted into the opening 24 of the lid box 20 from the inside of the vehicle. In doing so, the insertion hole 33 provided in the collar portion 32 of the inlet 30 is fitted onto the stud bolt 25 provided on the bottom 22 of the lid box 20 along the direction DR2. A nut is then fitted from the front end side of the stud bolt 25 and fastened using a tool. The inlet 30 is thus fixed to the lid box 20.

In doing so, a space for work using a tool is sufficiently kept around the stud bolt 25 in order to perform fixing work from the inside of the vehicle. The tool therefore does not interfere with the lid box 20. Even when the lid box 20 is configured such that a distance L1 between the end portions of the sidewall 23 positioned on the opposite side to the bottom 22 is reduced, the work using a tool can be readily performed irrespective of the size of the lid box 20.

As a result, the size of the lid box 20 can be reduced. With the size reduction of the lid box 20, the opening 12 provided at the vehicle body 10 for receiving the lid box 20 can be reduced in size. Accordingly, reduction in rigidity of the vehicle body 10 resulting from the opening 12 provided at the vehicle body 10 can be suppressed.

Figure 4:
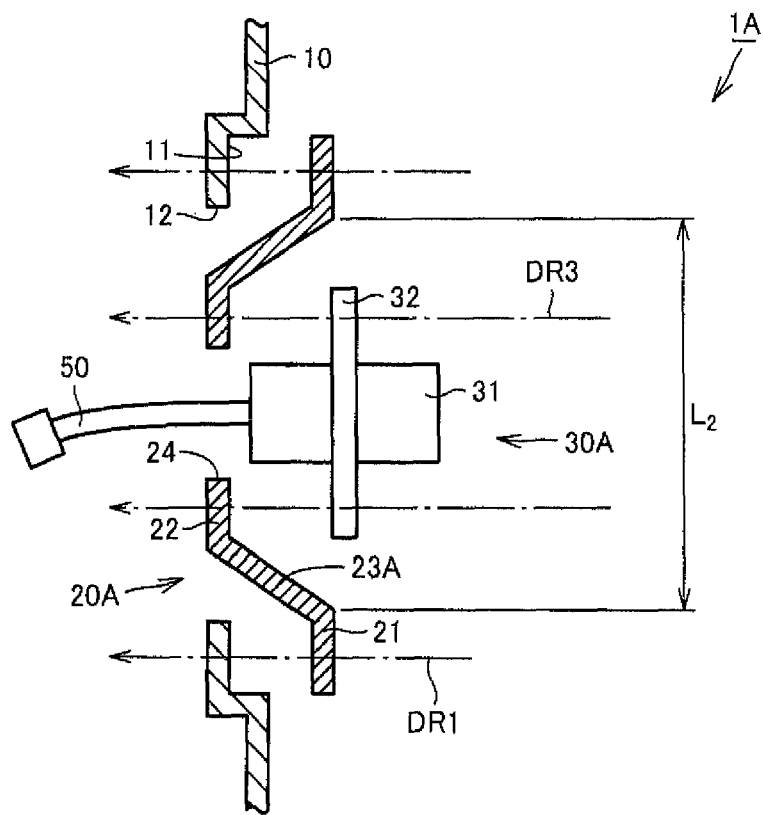
FIG. 4 is a diagram illustrating the manner of installation of a vehicle charging unit in a comparison example.

FIG. 4 is a diagram illustrating the manner of installation of a vehicle charging unit in a comparison example. Referring to FIG. 4, the manner of installation of a vehicle charging unit 1A in a comparison example will be described.

The manner of installation of the vehicle charging unit 1A in the comparison example differs from the manner of installation of the vehicle charging unit 1 according to the present embodiment in a way how an inlet 30A is fixed. The configuration of the inlet 30A is different accordingly, and the inlet 30A does not have stud bolts 25, 26 in the present embodiment.

To install the vehicle charging unit in the comparison example, first, a lid box 20A is attached to the vehicle body 10 from the outside of the vehicle in almost the same manner as the installation of the vehicle charging unit according to the present embodiment. In doing so, a bolt is inserted from the outside of the vehicle in the direction DR1.

The barrel portion 31 of the inlet 30A is then inserted into the opening 24 of the lid box 20A from the outside of the vehicle. A fixing part of the inlet 30A is cut through from the outside of the vehicle, and a bolt or other means is inserted along the direction DR3 and screwed in using a tool. The inlet 30A is thus fixed to the lid box 20A.

In doing so, the tool has to be inserted into the lid box 20A and a space for ensuring workability is required. The sidewall 23A is therefore configured so as to extend away from the part into which the bolt is inserted, in order to prevent interference of the tool with the sidewall 23A. A distance L2 between the end portions of the sidewall 23 positioned on the opposite side to the bottom 22 is therefore greater than the distance L1 in the embodiment, and the size of the lid box 20A is larger than the size of the lid box 20 according to the embodiment. The opening 12 provided at the vehicle body 10 is larger, thereby reducing the rigidity of the vehicle body 10.

As described above, in the present embodiment, the stud bolt 25 provided on the lid box 20 to protrude toward the inside of the vehicle in the attached state is used to attach the inlet 30 to the lid box 20 from the inside of the vehicle. With this structure, the work space for fixing the inlet 30 can be kept. The size of the lid box 20 therefore can be reduced as described above, and the opening 12 of the vehicle can be reduced in size. As a result, reduction in rigidity of the vehicle body 10 resulting from the opening 12 can be suppressed.

The lid box 20 is attached to the vehicle body 10 and the inlet 30 is fixed to the lid box 20 such that the stud bolts 26, 25 provided on the lid box 20 are not exposed on the outside of the vehicle. This structure eliminates the need for a cover for hiding the bolts from the outside of the vehicle and reduces the number of components.

Since the stud bolts 26, 25 are not exposed on the outside of the vehicle, it is unlikely that the bolts are removed from the outside of the vehicle, thereby preventing theft of the inlet 30.

The insertion hole 33 is provided in advance at a position corresponding to the stud bolt 25 during formation of the inlet 30, and this structure can eliminate the cut-through work during installation of the inlet. The workability during installation is thereby improved.

Although the present invention has been described and illustrated in detail, it is clearly understood that the same is by way of illustration and example only and is not to be taken by way of limitation, the scope of the present invention being interpreted by the terms of the appended claims.

What is claimed is:

1. A vehicle charging unit comprising:
   a lid box configured to be attached to a body in a state in which the lid box is inserted into a first hole in the body of a vehicle from outside of the vehicle; and
   an inlet fixed to the lid box,
   the lid box including an attachment portion attached to the body, a bottom having a second hole formed therein, and a sidewall upright from the bottom and connecting the bottom with the attachment portion,
   the bottom having a first stud bolt protruding toward inside of the vehicle in a state in which the lid box is attached to the body,
   the inlet including a barrel portion capable of receiving a charge connector from outside of the vehicle and a collar portion positioned around the barrel portion,
   the collar portion being fixed with the first stud bolt in a state in which the barrel portion is inserted into the second hole from inside of the vehicle, wherein
   the first stud bolt is provided so as not to be exposed on an outside of the vehicle in a state in which the lid box is attached to the body.

2. The vehicle charging unit according to claim 1, wherein the attachment portion is a flange portion provided at an end portion of the sidewall positioned on an opposite side to the bottom and has a second stud bolt protruding toward the bottom side, and
   the attachment portion is attached to the body with the second stud bolt.

3. The vehicle charging unit according to claim 2, wherein the second stud bolt is provided so as not to be exposed on outside of the vehicle in a state in which the lid box is attached to the body.

* * * * *